March 4, 1924.
F. O. BALL
CARBURETOR
Filed Dec. 28, 1916  3 Sheets-Sheet 3
1,485,759
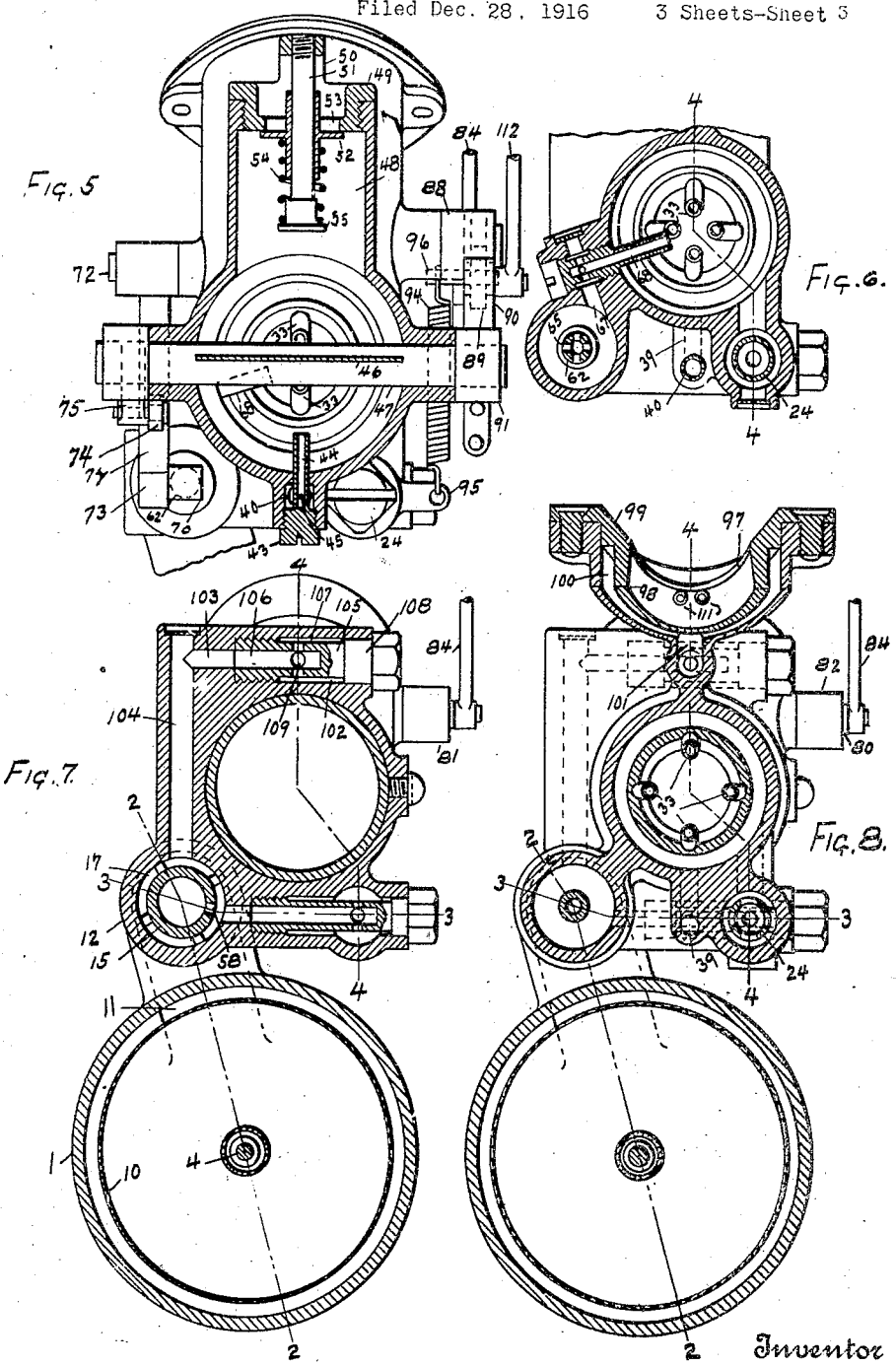

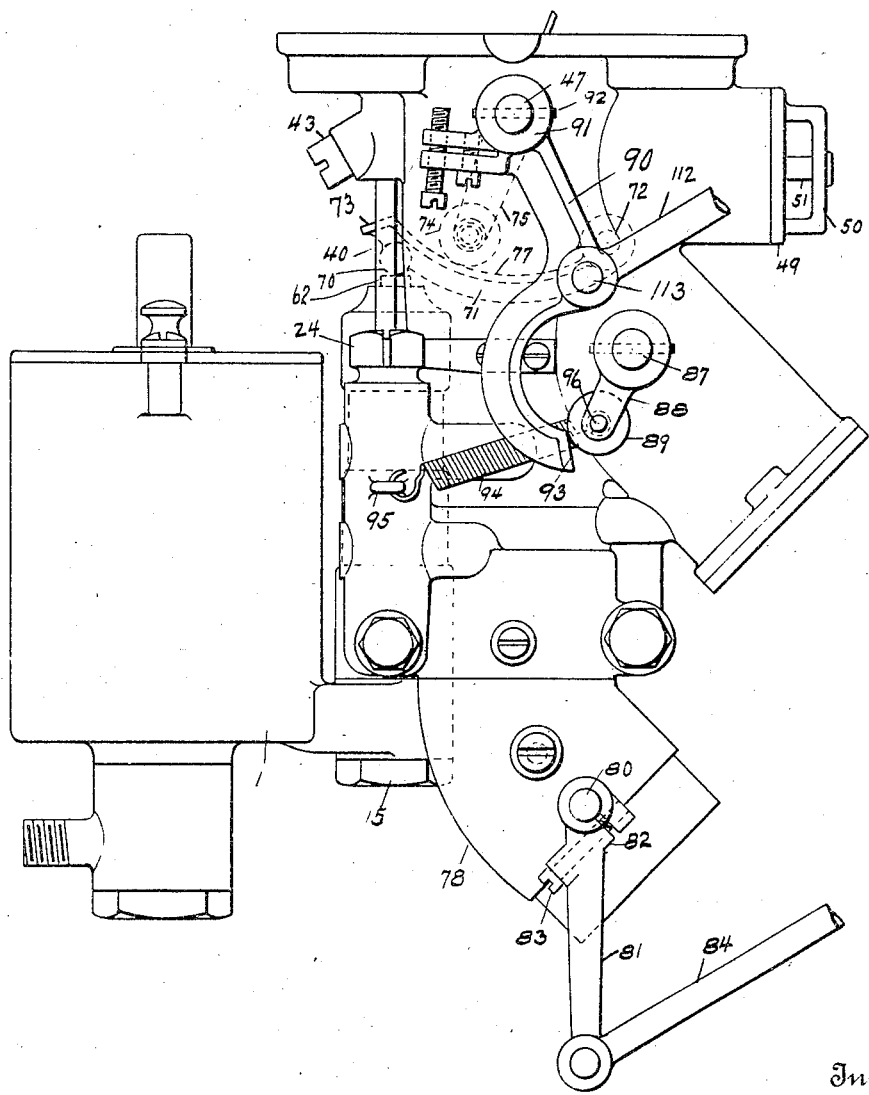

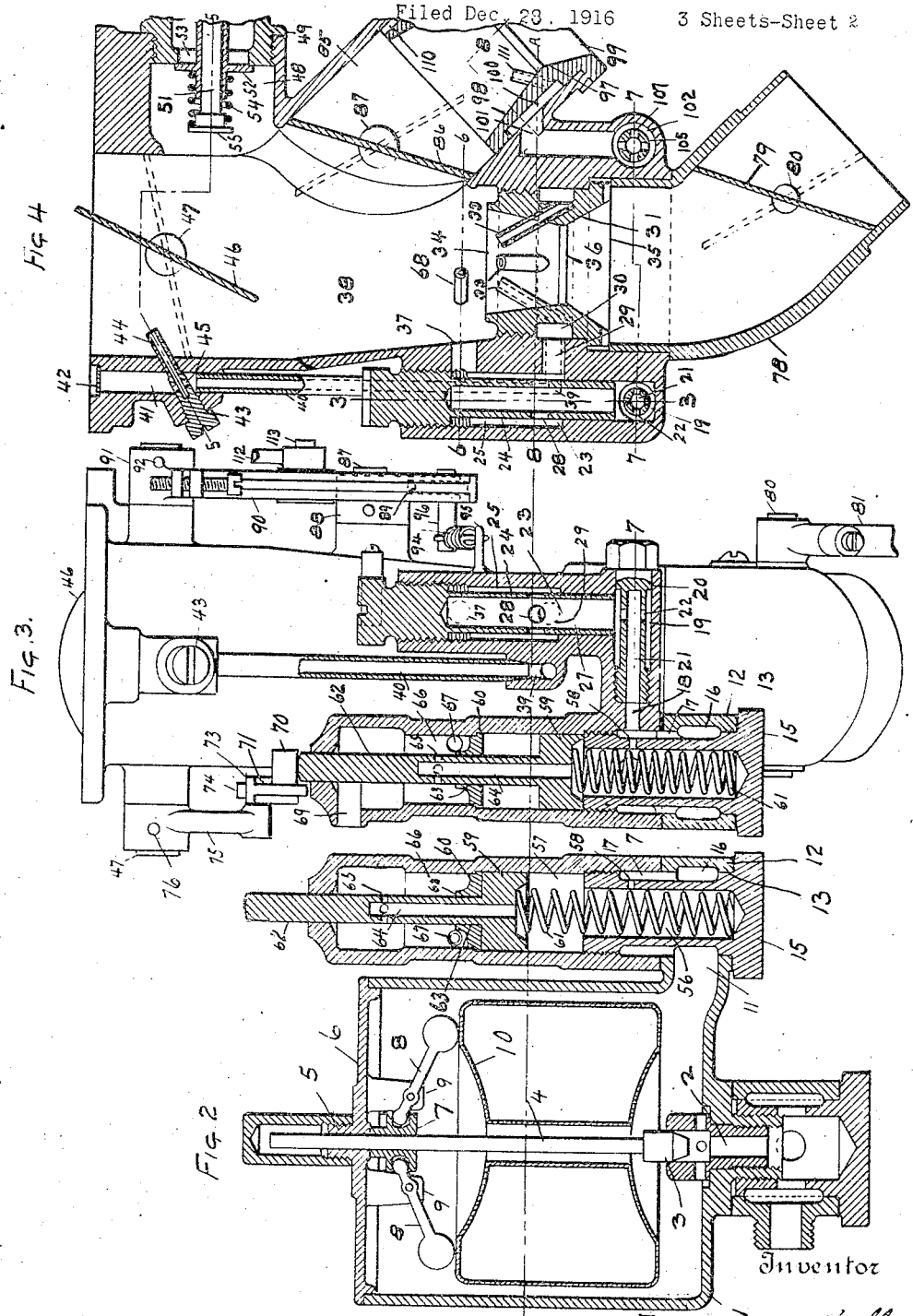

Patented Mar. 4, 1924.

1,485,759

UNITED STATES PATENT OFFICE.

FREDERICK O. BALL, OF DETROIT, MICHIGAN, ASSIGNOR TO BALL & BALL CARBURETOR COMPANY, OF DETROIT, MICHIGAN, A CORPORATION OF MICHIGAN.

CARBURETOR.

Application filed December 28, 1916. Serial No. 139,391.

*To all whom it may concern:*

Be it known that I, FREDERICK O. BALL, a citizen of the United States, residing at Detroit, in the county of Wayne and State of Michigan, have invented new and useful Improvements in Carburetors, of which the following is a specification.

This invention relates to carburetors and consists in certain improvements in the construction thereof as will be hereinafter fully described and pointed out in the claims.

The invention is illustrated in the accompanying drawings as follows:—

Fig. 1 shows a side elevation of the carburetor.

Fig. 2 is a section on the lines 2—2 in Figs. 7 and 8.

Fig. 3 is a section on the lines 3—3 in Figs. 4, 7 and 8.

Fig. 4 is a section on the lines 4—4 in Figs. 6, 7 and 8.

Fig. 5 is a section on the line 5—5 in Fig. 4.

Fig. 6 is a section on the line 6—6 in Fig. 4.

Fig. 7 is a section on the lines 7—7 in Figs. 3 and 4.

Fig. 8 is a section on the lines 8—8 in Figs. 3 and 4.

1 marks the fuel or float chamber, 2 the inlet to this chamber, 3 the float valve, 4 the stem running from the float valve, 5 a stem guide in the cover 6, 7 a spool secured to the stem 4, 8 weighted levers engaging the spool and pivoted on the projections 9 in the cover and 10 the float arranged around the stem 4 and operating on the levers 8. So far as the invention involved in this application is concerned, this float chamber is, or may be of any common construction.

A fuel outlet 11 from the float chamber extends into a projection 12. A vertical opening 13 is arranged in this projection and a screw 15 extends through the opening 13 and the projection 12 into an opening 17 on a projection extending from the body of the carburetor. The opening 11 has an annular portion 16 extending around the screw 15 and completes communication with the opening 17 entirely around the screw, the upper end of the screw forming a closure for the passage 17. A lateral passage 18 extends from the opening 17 and this extends into an enlarged opening 19 in which a screw 20 is placed, the screw forming a closure for the end of the passage 19. The screw has a longitudinal passage 21 which with the screw in place forms a continuation of the passage 18. Radial openings 22 extend from the longitudinal passage 21. The capacity of the passage is determined by the openings through this screw and the flow may be thus controlled by substituting screws having openings of different capacities.

An upright passage 23 extends from the passage 19. This passage is also arranged in a projection in the body of the carburetor. A screw 24 is arranged in the passage 23. The screw being slightly smaller in diameter than the passage 23 forms an annular passage 25. The lower end of the passage 23 is reduced in size forming a closure shutting off the annular passage 25 from the passage 19. A central passage 27 is arranged in the screw 24. Radial openings 28 are arranged in the screw and these openings are approximately at, but preferably slightly below the fuel level A—A. The position of the openings 28 with relation to this fuel level may be varied by adjusting the screw 24 up or down as the conditions may require as will be more fully explained.

A passage 29 leads from the passage 25 to an annular chamber 30. The annular chamber 30 is preferably formed on the outer walls of the Venturi tube 31, the Venturi tube having its upper end screw-threaded and being screwed into the suction passage of the carburetor. Spray nozzles 33 extend through the walls of the Venturi tube and extend upwardly from the chamber 30 preferably on a slant and terminate in the Venturi passage away from the walls of the Venturi tube. The upper ends of these spray nozzles are above the fuel level.

The Venturi tube has the discharge end 34, inlet end 35 and the point of greatest restriction at 36. The taper of the portion 35 is more abrupt than the taper of the discharge side of the tube, the angles being preferably about 30° and 7° for these tapers.

A passage 37 connects the upper end of the passage 25 with the mixing chamber 38.

To more perfectly atomize the fuel is one of the principal objects of this invention. The atomization of the fuel is ordinarily accomplished by subjecting it to the action of a current of air. A current of higher velocity is more effective than a current of low velocity and consequently it is desirable to subject the fuel to air at as high a velocity as practical. On the other hand, the velocity is dependent on the suction and if the restriction is increased so as to increase the suction and the velocity, the resistance offered to the engine is increased which, of course, is undesirable. To get high velocity with as small resistance as possible, the restriction is ordinarily formed by a Venturi tube and the nozzle or fuel delivery is commonly made at a point in the Venturi tube having high velocity.

This high velocity in the Venturi tube also results in a marked reduction in the pressure of the air at this point—the higher the velocity, the lower the pressure. The pressure also at the point of high velocity in the Venturi tube is very much below the pressure in the mixing chamber, notwithstanding the fact that the flow through the Venturi tube is induced by the reduced pressure in the mixing chamber. I have taken advantage of this variation in pressure to create a current of air into which the fuel may be fed so that it may be atomized not only by the main flow of air through the suction passage but also by this current of air passing from the mixing chamber through a bypass to the point of lower pressure in the Venturi tube. In the construction shown, the links in this circuit are the passages 37, 25, 29, 30 and 33. In this way the fuel is subjected to a current of high velocity in the bypass formed by the passages just named and reaches the nozzles 33 in the form of an emulsion or spray. This spray is then subjected to the current of air passing through the Venturi tube and is still further atomized. The result is an almost complete atomization with the resulting possibility of using any fuel with greater efficiency and also making it possible to use less volatile fuel.

The point of lowest pressure in the Venturi tube is adjacent to the wall of that tube immediately above the throat but if the spray of fuel is delivered at this point it tends to follow up the walls of the Venturi tube and does not get into position to be brought into contact with the larger volume of air. For this reason, I have extended the nozzles to a point away from the walls of the Venturi tube and to a position that will deliver the spray to a point where the main volume of air passes. This point of delivery reduces the velocity through the bypass somewhat but is more than compensated for by the proper locating of the discharge end of the nozzles with relation to the main current.

It is desirable to provide means for giving a proper mixture for idling. In the present carburetor, this is accomplished by the following constructions:— A passage 39 extends through the walls of the carburetor from the annular passage 30 and is connected by a tube 40 with the passage 41. This passage has a closure 42 at its upper end and a screw 43 extends through it into the suction passage above the throttle 46. The screw 43 has the passage 44 extending from the inner end which is put into communication with the passage 41 by the radial openings 45. When the throttle is closed a mixture of fuel and air is taken up from the chamber 30, carried through the passages leading to the nozzle formed by the screw 43 and delivered above the throttle into the slight amount of air leaking past the throttle. The air for this mixture in the structure shown comes from the intake of the carburetor. This may be adjusted to give perfect idling.

Another important factor in carburetor designing is the proper proportioning of the fuel and air. The flow of fuel is usually induced by the suction in the suction passage. In order to have the flow of fuel cease as the suction ceases, it has been common to have the end of the nozzle somewhat above the fuel level. Before any fuel is delivered in such a construction an initial suction sufficient to overcome the head represented by the difference between the fuel level and the height of the nozzle must be created. This suction is usually accompanied by a flow of air so that the initial flow of air and flow of fuel is not coincident and in consequence the flow of air and fuel with increasing suction do not produce, when plotted, coincident curves, although the curves as a whole may follow the same general law. Attempts have been made to overcome the effect of this negative head in different ways, the most common of which is to provide a yielding air valve which retards the flow of air so as to produce an initial head necessary to bring the fuel to the level of the nozzle.

In this invention, this difficulty is effectively obviated because the openings 28 may be placed at the fuel level. This is possible because the discharge ends of the nozzles 13 are above the level and prevents leakage. With the first flow of air through the Venturi tube a flow of air is induced through the bypass taking up and breaking into a spray the fuel deposited in the passage 29 and well 30. The bypass and well are swept clear of liquid fuel. The level of the discharge ends of the nozzles do not form a gravity head while the carburetor is in operation, because nothing but spray passes through them. As a result there is no gravity head to overcome. On the contrary the bottom of the openings 28 may be, and for the idling device preferably are slightly below the fuel level so that fuel is delivered into the air stream by said suction augmented by gravity so slight as to be negligible at ordinary speeds but very effective at idling speeds. It is possible, therefore, to maintain a proper proportion between the fuel and air because the flow of both is induced by the same suction effect formed by and incident to the reduced pressure of the mixing chamber.

This construction will carry the proportions without the use of valves or other auxiliaries through a wide range, but when the operation of the carburetor has progressed to nearly its maximum capacity, there is sufficient variation in the proportions ordinarily to make it desirable to augment the air slightly. This disturbance in proportions is caused by the obstruction formed by the nozzles in the air passage. I have provided for this by the utilization of an auxiliary air passage 48. A valve carrier 49 is screwed in this passage. A yoke 50 is mounted on the carrier and a pin 51 extends inwardly from the yoke. A valve 52 is slidingly mounted on the pin 51 and seats on the end of the carrier 49 and controls an opening 53. A spring 54 is arranged between the valve and the head 55 on the pin 51. The spring is so tensioned that the valve opens only in the later ranges of the throttle opening.

So far as the feeding of fuel spray through the nozzles 33 is concerned the bottom of the openings 28 may be at the fuel level thus eliminating any gravity head. With the minute quantity delivered through the idling nozzle 44 a very nice adjustment of this level is desirable to get the best results. The adjustment of the level may be desirable, however, for the feeding of fuel through the nozzles 33. The relative adjustment so as to form the gravity head has heretofore been accomplished by variations of adjustment in the float chamber. In this invention I accomplish this adjustment by varying the height of the radial openings 28 in the screw 24. By adjusting the screw 24 the height of these openings is varied. As before stated the air sweeps the well 30 clear of liquid fuel so that the head is determined by the position of the passage 28.

It will be noted, therefore, that in this construction the fuel is subjected to the suction incident to the reduced pressure of the mixing chamber and the pressure head thus effected (the fuel in the float chamber being under atmospheric pressure) varies as the pressure in the mixing chamber varies. The passages 37, 25, 29 and well 30 have a capacity sufficient to communicate approximately full mixing chamber pressure to the fuel and the nozzles are relatively so small as not to disturb this pressure condition on the fuel conduit discharging through the opening 28. In addition to this there may be, if desired also a gravity head, ordinarily very slight, but which may be adjusted very closely by the screw 24 and is of a special advantage with relation to the idling nozzle 44. It will also be noted the passage 37 leads from a point in the mixing chamber always having, while air is flowing through the mixing chamber, higher pressure than exists at the discharge end of the nozzle 33 so that the air always moves in one direction through the bypass and in quantities to spray the fuel through the well and nozzles. As stated, with this device the negative head is eliminated. This is true so long as there is sufficient air current through the Venturi tube and the nozzles to spray the liquid in the well. But when the throttle is sufficiently closed to reduce the velocity of this air current to such an extent that it will not affect this spraying action the well then fills with liquid and if fuel were continued to be fed through the nozzles it would be subjected to a negative head equal to the height of the ends of the nozzle above the fuel level. With the slight velocity of air under these conditions this would not be sufficient to feed fuel and the engine would stop. With the two-stage carburetor here shown this condition is retarded very much because the primary carburetor is so small that the high velocity through the Venturi tube is continued to very nearly the point of closing the throttle. The bypass, however, leading to above the throttle is given in this construction a peculiar relation in that it takes up the fuel from the well when the conditions through the Venturi tube otherwise bring about a negative head and this rapid velocity through the bypass to above the throttle continues the spraying action and consequently continues the carburetor in action with a small gravity head. This is particularly important in idling stages of running as it is at this point that it is difficult to maintain the proper relations as to fuel and air.

When the throttle is suddenly opened the supply of fuel must be momentarily augmented to compensate for the greater inertia of the fuel than air and consequently its more sluggish response to the new condition, as well as conditions between the carburetor and the engine. Devices, ordinarily called "pick-up devices" have been devised for this purpose. In the present construction this is accomplished as follows: The screw 15 has a passage 56 extending downwardly from its upper end, this passage opening into a cylinder or chamber 57. A radial opening 58 through the wall of the screw connects the passages 17 and 56. A plunger 59 operates in the cylinder 57 and is maintained against a collar or closure plate 60 by means of the spring 61. A stem 62 extends upwardly from the plunger 59 through an opening 63 in the closure plate 60. The stem has a central bore 64 and this is provided with the radial openings 65 which are above the plate 60 with the plunger in its lower position as shown in Fig. 3. The portion above the plate 60 forms a chamber or well 66 and this is connected by a passage 67 with the mixing chamber, the end of the passage 67 terminating in a nozzle 68 which extends out sufficiently to deliver fuel into the main air flow through the suction passage. The chamber 66 is put into communication with the atmosphere by a passage 69 at its top.

A stem 62 extends through the top of the chamber 66 and is in the path of a projection 70 on a lever 71. The lever 71 is pivotally mounted on the body of the carburetor by means of a pin 72 (see Fig. 5). The lever 71 terminates in a cam surface 73 which is in the path of a roller 74 mounted on a rock arm 75. The rock arm 75 is mounted on the shaft 47 which carries the throttle 46 and is locked thereon by means of the pin 76. When the throttle is closed the position of the rock arm 75 is such as to permit the spring 61 to force the plunger and the lever 71 to their upper positions. The fuel flows through the opening 58 to the passage 56 and cylinder or chamber 57. When the throttle is opened, the rock arm through the roller 74 acting on the cam surface 73 moves the lever 71 downwardly, forcing the stem 62 and with it the plunger 59 downwardly and this downward movement forces fuel upwardly through the bore 64 and openings 65 into the well or chamber 66, the opening 58 resisting a back-flow sufficiently to accomplish this purpose. The inflowing air sprays this fuel through the nozzle 68 and thus supplements the normal supply through the nozzles 33 so as to give to the carburetor the necessary fuel for "pick-up."

I prefer to provide the lever 71 with a surface 77 which will permit of the movement of the rock arm 75 without actuating the lever 71 after the plunger is depressed. Inasmuch as it is desirable to have the "pick-up" accomplished with a slight movement of the throttle, the cam 73 is so formed as to complete the movement of the plunger with a very slight movement of the throttle and then by means of the curved surface 77 to permit of a further movement of the rock arm without a further movement of the lever 71.

The carburetor is provided with the air intake fitting 78. This is provided with the usual choke valve 79, the choke valve being mounted on a rock shaft 80. A lever 81 is fixed on the rock shaft, the lever being provided with a lug 82 which is operated by a screw 83 for this purpose. A link 84 extends from the arm 81 to any convenient point of operation. The choke valve varies the initial resistance to the flow of air and thus adjusts the proportioning of the air and fuel under different conditions, especially differences in temperature which effect the viscosity of the fuel. The choke valve 70 in this respect operates in the usual manner.

In order to get high velocity through the air passages of the carburetor so far as described, it is necessary to reduce the capacity of these passages below what is commonly desirable for the maximum capacity of the carburetor. To take care of this difficulty, carburetors have been formed utilizing that portion of the carburetor so far as described as a primary charburetor and bringing in for the maximum capacity of the carburetor a secondary carburetor. This is provided in the present carburetor as follows:—The secondary carburetor has the air passage 85 which is inclined to the line of air flow through the mixing chamber so that the air entering through this passage 85 will enter the air flow through the mixing chamber with as little disturbance as possible. A throttle 86 is arranged in the passage 85. The throttle 86 is mounted on a rock shaft 87. An arm 88 is fixed on the rock shaft 87 and a roller 89 is mounted on the end of the rock shaft 87 in the path of the end of the lever 90. The lever 90 is provided with a hub 91 which is secured on the rock shaft 47 of the main throttle by a pin 92. The end of the lever 90 is provided with a surface 93 which operates on the roller 89. The position of the parts is such that the surface 93 on the end of the lever picks up the roller 89 just before the full opening of the throttle 46 and with the slight continued movement of the throttle 46 to bring it to full opening, the throw of the lever 90 is sufficient to open the throttle 86. A spring 94 extends from a lug 95 on the body of the carburetor to a pin 96 on the rock arm 88, this pin being also utilized for the bearing for the roller 89. The spring closes the throttle 86 as the lever 90 is retracted.

A Venturi tube 97 is arranged in the passage 85 and has discharge and inlet angles 98 and 99 arranged substantially as are the angles on the Venturi tube 31. An annular groove is formed in the outer surface of the Venturi tube so that when the tube is placed in the passage 85 it forms an annular chamber 100 surrounding the Venturi tube. A passage 101 leads from the annular chamber 100 to the passage 102. The passage 102 is connected with a passage 103, and the passage 103 by a passage 104 with the chamber or passage 17 and is thus put into communication with the float chamber. A screw 105 is placed in the passage 102 and this screw has an opening 106 which is in immediate communication with the passage 103. The screw does not fill the passage 102 and forms a chamber 107 which is closed at its outer end by the shoulder 108 on the screw. Radial openings 109 connect the interior of the screw with the chamber 107. The annular chamber 100 is put into communication with the mixing chamber by a passage 110. This passage is formed by merely flattening a portion of the end of the Venturi tube so that it will not come into contact with the walls of the passage 85. Nozzles 111 extend from the bottom of the annular chamber 100 through the walls of the Venturi tube, the point of discharge being just above the vena contracta of the Venturi tube. Two nozzles are preferably used as shown in Fig. 8.

The secondary carburetor, therefore, operates on the same principle as does the primary carburetor, that is to say, the fuel is subjected to an air current formed in the bypass made up of the passage 110 and the annular chamber or passage 100 so that the fuel is sprayed and delivered at the nozzle 111 as an emulsion and has, therefore, a preliminary breaking up or atomization which is completed by the action of the air taking up the spray from the nozzle.

The throttle is operated by any desired mechanism, as for instance, the link 112 which is secured to the throttle lever 90 by means of a pin 113. Different adjustments of the flow of fuel to the secondary carburetor are accomplished by providing the screws 105 having passages of different capacities.

What I claim as new is:—

1. In a carburetor, the combination of a mixing chamber; an air passage forming a restriction leading to the mixing chamber; a spray delivering device leading to and delivering a spray of fuel and air to the restriction; a fuel conduit leading to and delivering fuel to the spray delivering device; means comprising a bypass leading from the mixing chamber to the spray delivering device for inducing a flow of fuel to the spray delivering device, the bypass having a capacity relatively to the spray delivery device making the mixing chamber pressures communicated through the bypass the dominant factor in the control of the flow of fuel from the conduit to the spray delivering device.

2. In a carburetor, the combination of a mixing chamber; an air passage forming a restriction leading to the mixing chamber; a spray delivering device leading to and delivering a spray of fuel and air to the restriction; a fuel conduit leading to and delivering fuel to the spray delivering device; a bypass closed to the atmosphere leading from the mixing chamber to the spray delivering device, said bypass having a capacity relative to the spray delivering device to make the mixing chamber pressure communicated through the bypass the dominant factor in the control of the feeding of fuel to the spray delivering device.

3. In a carburetor, the combination of a mixing chamber; an air passage forming a restriction leading to the mixing chamber; a spray delivering device leading to and delivering fuel and air to the restriction; a fuel conduit leading to and delivering fuel to the spray delivering device; and means delivering a continuous flow of air to the spray delivering device and exerting a pressure control on the fuel conduit, the pressure of which varies as the mixing chamber pressure varies.

4. In a carburetor, the combination of a mixing chamber; an air passage leading to the mixing chamber having a restriction in the form of a Venturi tube; a spray delivering device comprising nozzles extending from the wall of the tube, and an annular passage surrounding the Venturi tube and from which the nozzles lead; a fuel conduit delivering fuel to the annular passage; and a by pass leading from the mixing chamber to the annular passage for delivering air to the spray delivering device and for communicating a controlling pressure to the fuel in the fuel conduit.

5. In a carburetor, the combination of a mixing chamber; an air passage forming a restriction leading to the mixing chamber; a throttle valve at the discharge of the mixing chamber; a spray delivering device leading to and delivering a spray of fuel and air to the restriction; a fuel conduit leading to and delivering fuel to the spray delivering device; a bypass closed to the atmosphere leading from the mixing chamber to the spray delivering device, said bypass having a capacity relative to the spray delivering device to make the mixing chamber pressure communicated through the bypass the dominant factor in the control of the feeding of fuel to the spray delivering device; and a spray delivering bypass leading from the spray delivering device to a point at the discharge side of the throttle.

6. In a carburetor, the combination of a mixing chamber; a throttle valve at the discharge of the mixing chamber; an air passage forming a restriction leading to the mixing chamber; a spray delivering device leading to and delivering a spray of fuel and air to the restriction; a fuel conduit leading to and delivering fuel to the spray delivering device; mechanism for varying the level of the point of discharge of the fuel conduit; means comprising a bypass leading from the mixing chamber to the spray delivering device for inducing a flow of fuel to the spray delivering device, the bypass having a capacity relatively to the spray delivery device making the mixing chamber pressures communicated through the bypass the dominant factor in the control of the flow of fuel from the conduit to the spray delivering device, and a spray delivering bypass leading from the spray delivering device to a point at the discharge side of the throttle.

7. In a carburetor, the combination of a suction passage; a throttle valve in the suction passage; a spray delivering device leading to and delivering a spray of fuel and air to the suction passage nearer the intake than the throttle, said spray device comprising a well; a fuel conduit leading to the well; an air conduit leading to the well from a source having a higher pressure than the suction passage at the point of delivery of the spray device; said conduit having a capacity with relation to the spray delivering device to supply air for spraying the fuel from the well through the spray delivering device; and a bypass leading from the well to the suction passage at the discharge side of the throttle, the bypass leading from a point in the well at approximately the same level as that part of the spray delivering device leading from the well to the suction passage, whereby the fuel delivered to the bypass is in the form of a spray making the influence of gravity on the fuel in the bypass negligible.

8. In a carburetor, the combination of a suction passage; a throttle valve in the suction passage; a spray delivering device leading to and delivering a spray of fuel and air to the suction passage nearer the intake than the throttle, said spray device comprising a well; a fuel conduit leading to the well and delivering fuel thereto by gravity; an air conduit leading to the well from a source having a higher pressure than the suction passage, at the point of delivery of the spray device, said conduit having a capacity with relation to the spray delivering device to supply air for spraying the fuel from the well through the spray delivering device; and a bypass leading from the well to the suction passage at the discharge side of the throttle, the bypass leading from a point in the well at approximately the same level as that part of the spray delivering device leading from the well to the suction passage, whereby the fuel delivered to the bypass is in the form of a spray making the influence of gravity on the fuel in the bypass negligible.

9. In a carburetor, the combination of a mixing chamber; a Venturi tube leading to the mixing chamber; an annular passage surrounding the Venturi tube; a series of nozzles passing from the annular passage through the walls of the Venturi tube; a bypass from the annular chamber to the mixing chamber; and means for supplying fuel to the annular chamber.

10. In a carburetor, the combination of a mixing chamber; a Venturi tube leading to the mixing chamber; an annular passage surrounding the Venturi tube; a series of nozzles passing from the annular passage through the walls of the Venturi tube, the nozzles extending beyond the walls of the Venturi tube; a bypass from the annular chamber to the mixing chamber; and means for supplying fuel to the annular chamber.

11. In a carburetor, the combination of a fuel chamber; means for maintaining a constant level therein; a suction passage; a well having an air current passing therethrough induced by the action of the air in the suction passage discharging into the suction passage; a fuel delivery passage leading from the fuel chamber and having a point of discharge into the well; and devices for adjusting the level of the point of discharge of the fuel delivery passage.

12. In a carburetor, the combination of a fuel chamber; means for maintaining a constant level therein; a suction passage; a well having an air current passing therethrough induced by the action of the air in the suction passage and discharging into the suction passage; a fuel delivery passage leading from the fuel chamber and having a point of discharge into the well below the fuel level; and devices for adjusting the level of the point of discharge of the fuel delivery passage.

13. In a carburetor, the combination of a fuel chamber; means for maintaining a constant level therein; a suction passage; a fuel delivery passage leading to said suction passage; and a hollow screw in said fuel delivery passage, said screw having openings forming a part of the delivery passage, the elevation of which may be adjusted by said screw to vary the effect of gravity in the discharge of fuel.

14. In a carburetor, the combination of a fuel chamber; means for maintaining a constant level therein; a suction passage; a throttle in the suction passage; a bypass leading from below to above the throttle; and means for delivering fuel to said bypass comprising means for adjusting the level of the discharge of fuel to the bypass.

15. In a carburetor, the combination of a fuel chamber; means for maintaining a constant level therein; a suction passage having a restriction therein forming areas of varying pressures in the suction passage; a throttle nearer the discharge than is the restriction; a bypass from an area of greater pressure to a point of less pressure in the suction passage below the throttle; a branch in said bypass leading to above the throttle; a fuel connection between the fuel chamber and the bypass; and means for adjusting the level of the discharge of the fuel connection to the bypass.

16. In a carburetor, the combination of a fuel chamber; means for maintaining a constant level therein; a suction passage having a restriction; a throttle nearer the discharge than is the restriction; a bypass leading from between the throttle and the restriction to a point in the suction passage at the restriction; a branch from said bypass extending to a point above the throttle; a connection between the fuel chamber and said bypass; and means for varying the level of the discharge of said connection to the bypass.

17. In a carburetor, the combination of a constant level fuel chamber; a suction passage; a throttle valve in the suction passage above the fuel level of the chamber; a spray delivering device leading to and delivering a spray of fuel and air to the suction passage nearer the intake than the throttle, said spray device receiving its fuel from the chamber at approximately the fuel level and delivering it in the form of a spray to the suction passage; and a bypass receiving fuel and air at approximately the fuel level of the fuel chamber and leading to a point at the discharge side of the throttle, the air spraying the fuel and carrying the same through the bypass in the form of a spray whereby the influence of gravity on the fuel in the bypass is negligible.

In testimony whereof I have hereunto set my hand.

FREDERICK O. BALL.